(12) United States Patent
Kang et al.

(10) Patent No.: US 11,966,152 B2
(45) Date of Patent: Apr. 23, 2024

(54) PROJECTOR INCLUDING COLOR FILTERS

(71) Applicant: LG ELECTRONICS INC., Seoul (KR)

(72) Inventors: Shingyu Kang, Seoul (KR); Kiso Bok, Seoul (KR); Jaehoon Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 128 days.

(21) Appl. No.: 17/417,353

(22) PCT Filed: Oct. 7, 2019

(86) PCT No.: PCT/KR2019/013112
§ 371 (c)(1),
(2) Date: Jun. 22, 2021

(87) PCT Pub. No.: WO2020/153573
PCT Pub. Date: Jul. 30, 2020

(65) Prior Publication Data
US 2022/0075245 A1    Mar. 10, 2022

(30) Foreign Application Priority Data

Jan. 22, 2019  (KR) .................. 10-2019-0008060

(51) Int. Cl.
*G03B 21/20*    (2006.01)
*G02B 5/26*    (2006.01)

(52) U.S. Cl.
CPC ............. *G03B 21/204* (2013.01); *G02B 5/26* (2013.01); *G03B 21/2066* (2013.01)

(58) Field of Classification Search
CPC .. G03B 21/204; G03B 21/2066; G03B 33/08; G02B 5/26; G02B 26/008; H04N 9/31; H04N 9/3117; H04N 9/3161
See application file for complete search history.

(56) References Cited

U.S. PATENT DOCUMENTS 9,432,640 B2    8/2016  Chang et al.
2015/0098070 A1*  4/2015  Hsieh .................. G03B 21/204
                                                                  359/326

(Continued)

FOREIGN PATENT DOCUMENTS

JP     2018138991    9/2018
KR   1020150036427   1/2014
KR   1020170030657   3/2017

OTHER PUBLICATIONS

PCT International Application No. PCT/KR2019/013112, International Search Report dated Jan. 16, 2020, 9 pages.

*Primary Examiner* — Magda Cruz
(74) *Attorney, Agent, or Firm* — LEE, HONG, DEGERMAN, KANG & WAIMEY

(57) ABSTRACT

A projector comprises: a light source that projects laser light; a first color filter including a reflective portion reflecting the laser light emitted from the light source, and a transmissive portion transmitting the laser light; a phosphorus plate that converts the laser light reflected from the first color filter into phosphorescent light; a second color filter including color films of different colors through which the phosphorescent light transmits; and a display element that is provided with the laser light transmitted from the first color filter and the phosphorescent light transmitted through the second color filter so as to project an image, wherein the projector can be reduced in volume since the number of lenses used in an optical system can be reduced by shortening an optical path.

13 Claims, 6 Drawing Sheets

(56) References Cited

U.S. PATENT DOCUMENTS

| | | | |
|---|---|---|---|
| 2015/0124431 A1 | 5/2015 | Motoya et al. | |
| 2015/0253653 A1* | 9/2015 | Fujita | G03B 21/204 |
| | | | 353/31 |
| 2015/0253654 A1* | 9/2015 | Hu | G03B 21/005 |
| | | | 353/31 |
| 2015/0316840 A1* | 11/2015 | Maeda | F21K 9/64 |
| | | | 353/31 |
| 2015/0354787 A1* | 12/2015 | Chang | H04N 9/3114 |
| | | | 427/164 |
| 2016/0349606 A1* | 12/2016 | Nishimori | G03B 21/204 |
| 2017/0255092 A1* | 9/2017 | Hu | G03B 21/206 |

* cited by examiner (a)

(b)

(a)

(b)

(c)

PROJECTOR INCLUDING COLOR FILTERS

CROSS-REFERENCE TO RELATED APPLICATIONS

This application is the National Stage filing under 35 U.S.C. 371 of International Application No. PCT/KR2019/013112, filed on Oct. 7, 2019, which claims the benefit of earlier filing date and right of priority to Korean Application No. 10-2019-0008060, filed on Jan. 22, 2019, the contents of which are all incorporated by reference herein in their entirety.

TECHNICAL FIELD

The present disclosure relates to a projector that improves a structure of an optical system separating light of a laser diode light source into a color light source.

BACKGROUND ART

A projector is used as an audio-visual image device that can be directly connected to a computer or camcorder and project an image onto a screen to provide various presentations or multimedia educations.

The projector synthesizes images according to light emitted from the light source and image signals, and the image is adjusted in a certain proportion, projected onto a screen, and displayed externally. As a light source for the projector, recent moves have been made to use light emitting diodes, laser diodes, organic light emitting diodes, etc. In particular, since laser diodes provide single wavelength light, they are highly efficient and can improve luminance, so research is being done on projectors that use laser diodes as light sources.

Blue light laser diodes can be used as light sources to rotate phosphor discs containing phosphorescent materials to selectively convert the wavelength of light. However, these wheel-shaped phosphor discs can cause abnormal flow, which has problems that affect noise and product reliability.

DISCLOSURE OF THE INVENTION

Technical Task

To solve the above problems, a technical task of the present disclosure is to provide a projector of which structures of an optical system and a color wheel are improved, thereby providing high brightness while decreasing the number and sizes of parts.

Technical Solutions

In one technical aspect of the present disclosure, provided is a projector including a light source projecting a laser light, a first color filter including a reflective part reflecting the laser light projected from the light source and a transmissive part transmitting the laser light, a phosphor plate converting the laser light reflecting from the first color filter into a phosphorescence, a second color filter including a color filter in a different color through which the phosphorescence passes, and a display element projecting an image by being provided with the laser light transmitted in the first color filter and the phosphorescence having passed through the second color filter.

The first color filter and the second color filter may be formed on a single disc.

The color film may be disposed at a position corresponding to the reflective part of the first color filter.

The first color filter may include the reflective part and the transmissive part disposed in a first distance from a center of the disc and the color film of the second color filter may be disposed in a second distance from the center of the disc.

The reflective part of the first color filter may be disposed in a manner of overlapping with the color film of the second filter.

The phosphor plate may include a phosphorescent material located in a same distance from a center of a rotating disc and one or two species of the phosphorescent material may be included.

The phosphor plate may include a fixed type mirror coated with a phosphorescent material reflecting the laser light by converting the laser light into the phosphorescence.

The projector may further include a first dichroic filter enabling one of the laser light reflecting from the first color filter and the phosphorescence reflecting from the phosphor plate to pass through and reflecting the other.

The projector may further include a second dichroic filter transmitting the laser light transmitted in the first color filter and transmitting the phosphorescence having passed through the second color filter.

The light source may include a laser diode emitting a blue light.

The phosphor plate may include a phosphorescent material converting the light source into yellow or green.

The projector may further include a first mirror reflecting and providing the laser light having passed through the first color filter to the display element.

The projector may further include a second mirror reflecting and providing the laser light reflecting from the first color filter to the phosphor plate.

Advantageous Effects

According to at least one embodiment of a projector of the present disclosure, the number of lenses used for an optical system can be decreased by shortening an optical path, thereby reducing a volume thereof.

In addition, a phosphor plate can use a fixed type structure instead of a wheel shape, thereby simplifying a volume and structure of an optical system.

In addition, a color filter is implemented with a single wheel, thereby resolving the difficulty of synchronization occurring in using a plurality of wheels.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the invention will become apparent to those skilled in the art from this detailed description.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

In the present application, terms such as "include" or "has" are used herein and should be understood that they are intended to indicate an existence of several components, functions or steps, disclosed in the specification, and it is also understood that greater or fewer components, functions, or steps may likewise be utilized.

Figure 1:
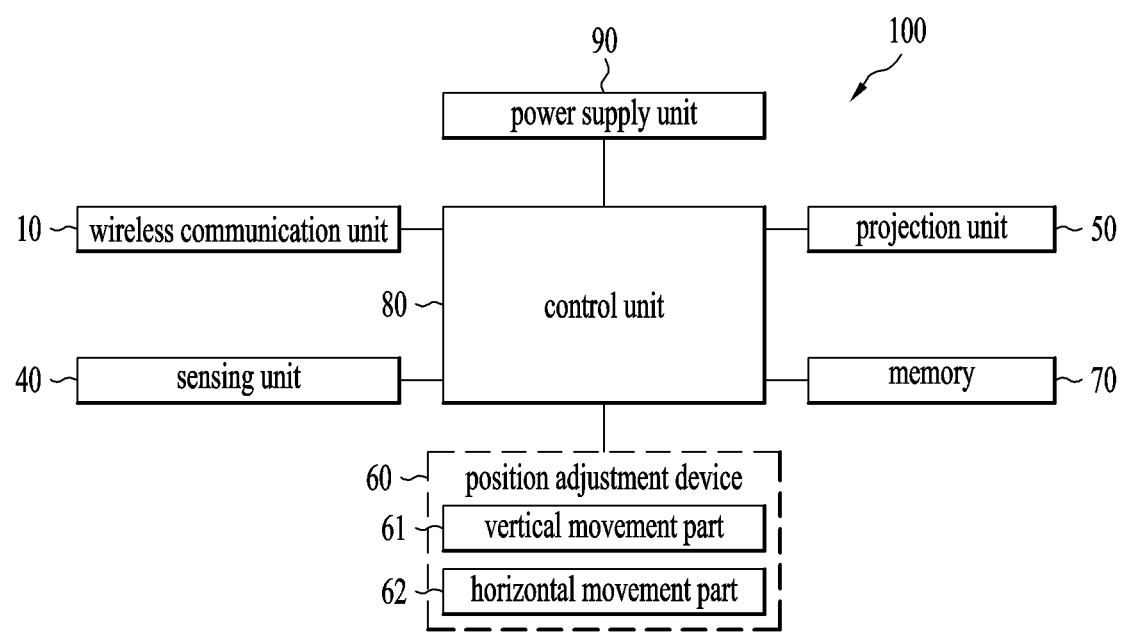
FIG. 1 is a block diagram of a projector according to one embodiment of the present disclosure.

FIG. 1 is a block diagram to describe a projector 100 related to the present disclosure.

Figure 3:
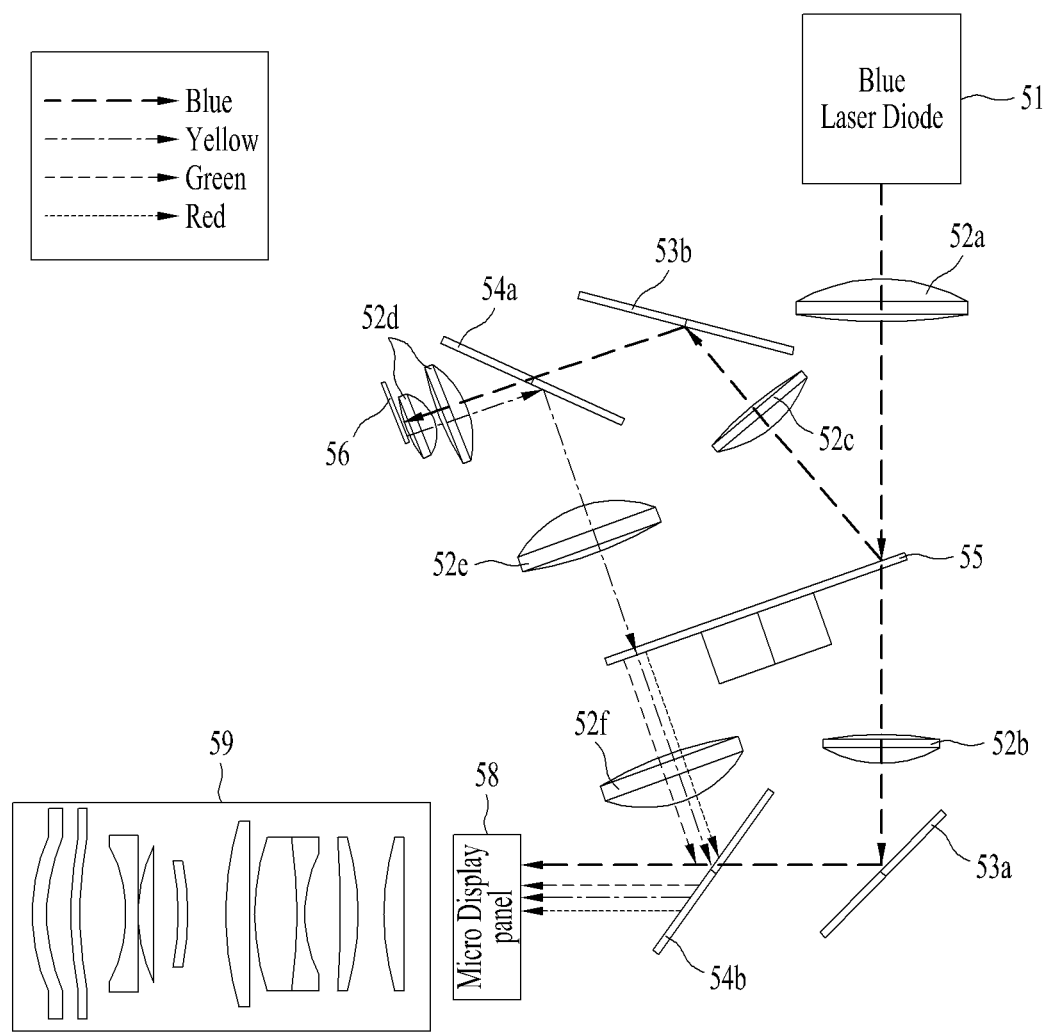
FIG. 3 is a diagram showing an optical system of a projector of the present disclosure.

A projector 100 may include a wireless communication unit 10, a sensing unit 40, a projection unit 50, a position adjustment unit 60, a power supply unit 90, etc. As the components shown in FIG. 3 are not mandatory to implement the projector 100, the projector 100 described in the present specification may have components more or less than those listed above.

The wireless communication unit 10 may transceive signals using a mobile communication module or a short-range communication module. Particularly, the wireless communication unit 10 may transceive specific commands or information with an external terminal. The wireless communication unit 10 may receive images such as photos, moving pictures and the like from the external terminal. In addition, the wireless communication unit 10 may provide a function of controlling the projector 100 by wireless like a remote controller using the short-range communication module.

The wireless communication unit 10 may receive a broadcast signal and/or broadcast related information from an external broadcast management server through a broadcast channel using a broadcast reception module. In addition, the wireless communication unit 10 may obtain a current location of the projector 100 using a position information module.

The sensing unit 40 may detect a presence or non-presence of an object approaching a prescribed detection surface or an object existing around without mechanical contact using a force of an electromagnetic field, infrared rays or the like.

The projection unit 50 performs a function of projecting an image signal and may be referred to as an optical system. The projection unit 50 may be implemented in a manner of including a light source 51 providing light, a transmissive display device and the like. In addition, the projection unit 50 may include a projection lens 59 for adjusting a size of a projected image on a projection area.

The position adjustment unit 60 performs a function of adjusting a direction in which the projector 100 projects an image. Particularly, the position adjustment unit 60 performs a function of adjusting a position of the projection unit 50. To this end, the position adjustment unit 60 may include a vertical movement part 61 and a horizontal movement part 62. The vertical movement part 61 may move the projection unit 50 up and down, and the horizontal movement part 61 may move the projection unit 50 right and left. A camera 20, the sensing unit 40 and/or the projection unit 50 of the projector 100 may be moved in top, bottom, right and left directions by the position adjustment unit 60.

The memory 70 may store an image to project, adjacent space information and/or projection area information.

In a manner of being combined with the wireless communication unit 10, the sensing unit 40, the projection unit 50, the position adjustment unit 60 and/or the memory 70, the control unit 80 may analyze a surrounding space structure, analyze a projection area, perform image correction, project an image, or transceive signals with an external terminal. Namely, the control unit 80 may control one or more of the above components in a manner of combining them to implement various embodiments described in the following.

The power supply unit 90 receives an external power or an internal power under the control of the control unit 80, thereby supplying a power necessary for an operation of each component. The power supply unit 90 may include a detachable battery.

Figure 2:
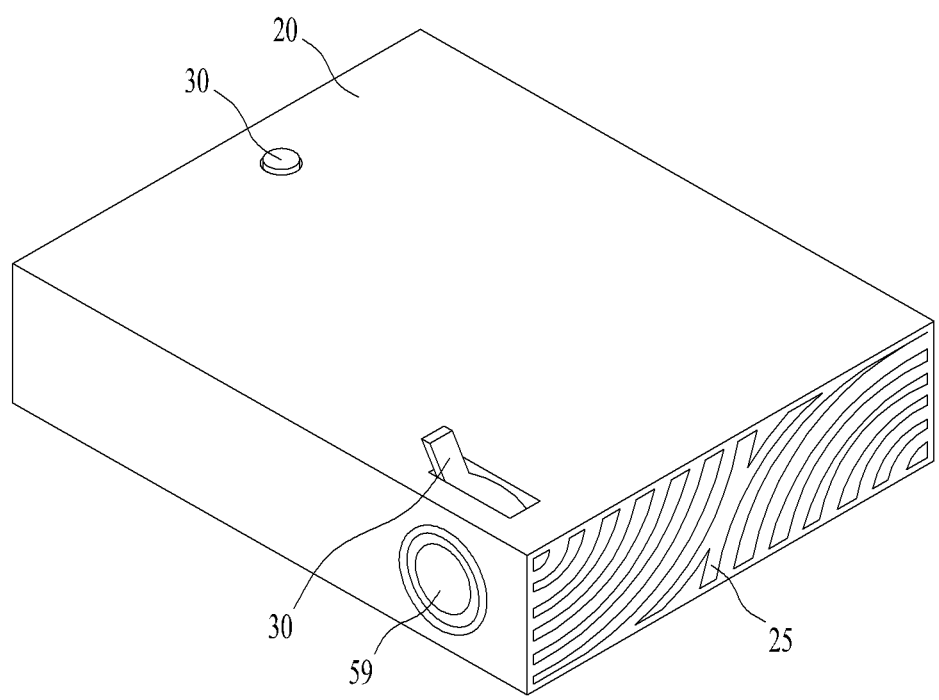
FIG. 2 is a perspective diagram showing a projector according to one embodiment of the present disclosure.

FIG. 2 is a perspective diagram showing a projector according to one embodiment of the present disclosure, in which a housing 20 of the projector 100 and a projection lens 59 exposed on a front side of the housing are shown. As heating parts such as a light source 51 and the like are disposed within the housing 20, a vent hole 25 may be formed in a lateral side of the housing 20 to dissipate the generated heat. Using a manipulation unit 30 exposed from the housing, a focus of a lens, a projection direction and the like can be adjusted.

A wireless communication unit 10, a sensing unit 40, a projection unit 50, a memory 70, a control unit 80, a power supply unit 90 and the like are provided within the housing 20. Light projected from a light source 51 is synthesized with image information in a display element 58, and then projected through the projection lens 59, whereby an image appears on a screen or a wall surface.

FIG. 3 is a diagram showing an optical system 50 of a projector 100 of the present disclosure. The optical system 50 of the projector 100 of the present disclosure uses a laser diode as a light source 51. Since the light emitted from the laser diode projects a laser light, it has high energy density, a constant phase and straightness, whereby luminance can be raised. In addition, the laser diode itself has the advantage of increasing its lifespan that is longer than that of a conventional lamp or a light emitting diode, and can be implemented at a low manufacturing cost and in a smaller size, whereby a size of the projector 100 can be reduced. Regarding laser light, since blue light is more efficient than green light as the light of a specific wavelength, it is advantageous in terms of efficiency to use a laser diode that emits blue light.

Since blue laser light alone cannot produce a variety of colors, it is necessary to convert them to phosphorescence with different wavelengths (colors) using a phosphor plate 56. Yet, in order to use laser light emitted from the light source 51 as blue intactly, light emitted from the light source 51 needs to be divided into two.

Figure 6:
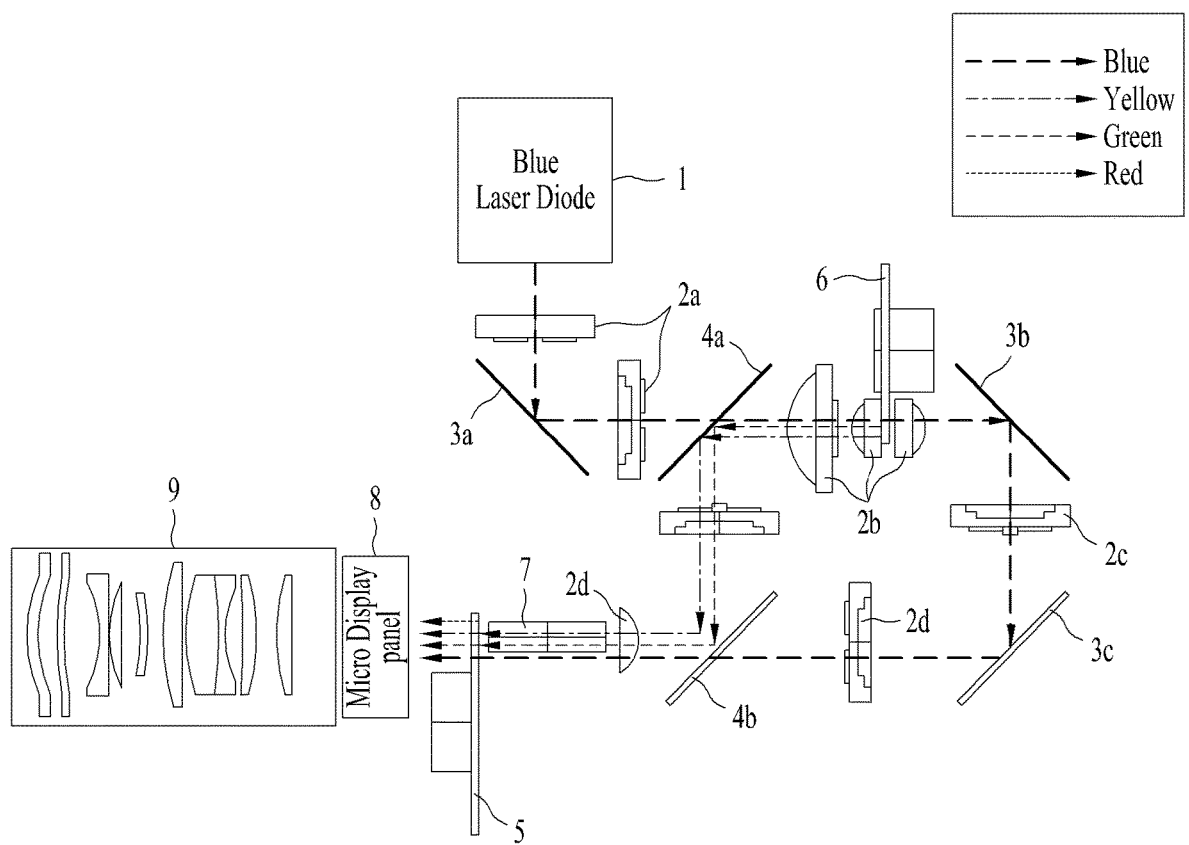
FIG. 6 is a diagram showing an optical system of the related art.

FIG. 6 is a diagram showing an optical system of the related art. In the related art, light emitted from a light source 1 is separated using a phosphor wheel 6. The phosphor wheel 6 is a disc including a first area coated with a phosphorescent material at a position in a prescribed distance from a rotation center and a second area failing to be coated with the phosphorescent material. As the phosphor wheel 6 rotates, a laser-light passing area changes.

If the laser light is provided to the first area coated with the phosphorescent material, it is reflected and converted into phosphorescence of green or yellow light. The later light passes through the second area not coated with the phosphorescent material and is supplied to a display element 8 that produces an image. If the phosphorescent material coated on the phosphor wheel 6 includes a single species, it can be converted into phosphorescence of a single color. Yet, since the phosphorescent material includes two species, it can be converted into yellow light and green light. Since red light has a big difference from blue light in wavelength, the conversion is difficult and may be converted into yellow light or yellow light and green light.

The reflected phosphorescence is transferred to a color wheel 5 using a condensing lens such as a relay lens or a collimator lens. The color wheel 5 is a disc type member supplying light in color necessary for image implementation and includes a color film different per area in the same distance from a center. The color film plays a role in converting a supplied light into a light of a specific wavelength, and color films in different colors may be arranged on the divided areas of the color wheel 5, respectively.

The light having passed through the color film synthesizes an image through a display element and the image is projected on a screen. To enlarge the image projected on the screen, the light may pass through a projection lens 8. The display element 8 is a device for displaying an image in a manner of arranging mirrors in minute sizes on a silicon wafer and controlling light to be reflected via the mirrors. Each mirror plays a role as a single pixel and reflects light supplied from the light source 1 selectively, thereby implementing an image.

As the related art structure shown in FIG. 6 further includes the phosphor wheel 6 as well as the color wheel 5, a volume of an entire optical system increases and an optical path becomes longer. Hence, the number of condensing lenses increases, thereby causing a problem that the number of parts increases. In addition, since an accurate image can be supplied by matching the periodicity of the color wheel 5 and the phosphor wheel 6, precision is also needed in control.

To solve such problems, the present disclosure includes a first color filter 551 through which a laser light projected from the light source 51 passes. The first color filter 551 includes a transmissive part 55f enabling the laser light to pass therethrough and a reflective part 55e reflecting the laser light. A transmissive light passing through the transmissive part 55f is provided to the display element 58 to supply a blue light, and the reflective light reflected by the reflective part 55e will be converted to a yellow light, a green light and a red light through a phosphor plate 56 and a second color filter 552. Therefore, a size of the reflective part 55e may be formed greater than that of the transmissive part 55f.

The first color filter 551 may be implemented as a wheel that is formed on a disc and rotates thereon. The first color filter 551 may be implemented on the same disc with the second color filter 552 described later. The second color filter 552 includes color films 55b, 55c and 55d for supplying red, green, yellow and blue colors generated from phosphorescence of which wavelengths are converted through the phosphor plate 56, and may be implemented in a manner that the color films 55b, 55c and 55d are disposed in the areas partitioned as fan shapes on the disc, respectively. If the first color filter 551 and the second color filter 552 are implemented as a single wheel, the number of wheels is not increased. When a laser light reflects from the first color filter 551 and becomes a reflective light, synchronization is facilitated in a manner that the second color filter 552 enables lights to be supplied through the yellow, green and red color films 55b, 55c and 55d.

Figure 4:
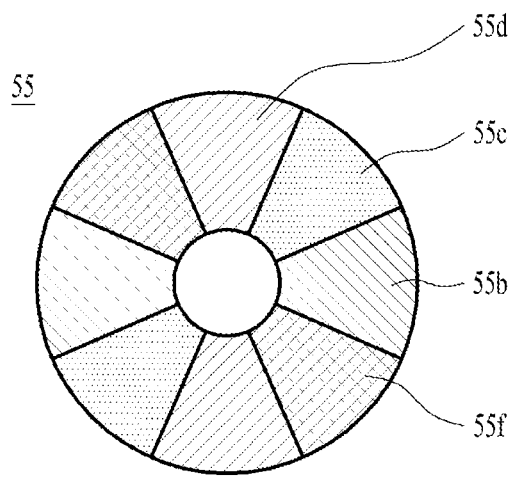
FIG. 4 is a diagram showing a color wheel of a projector of the present disclosure.
Figure 4:
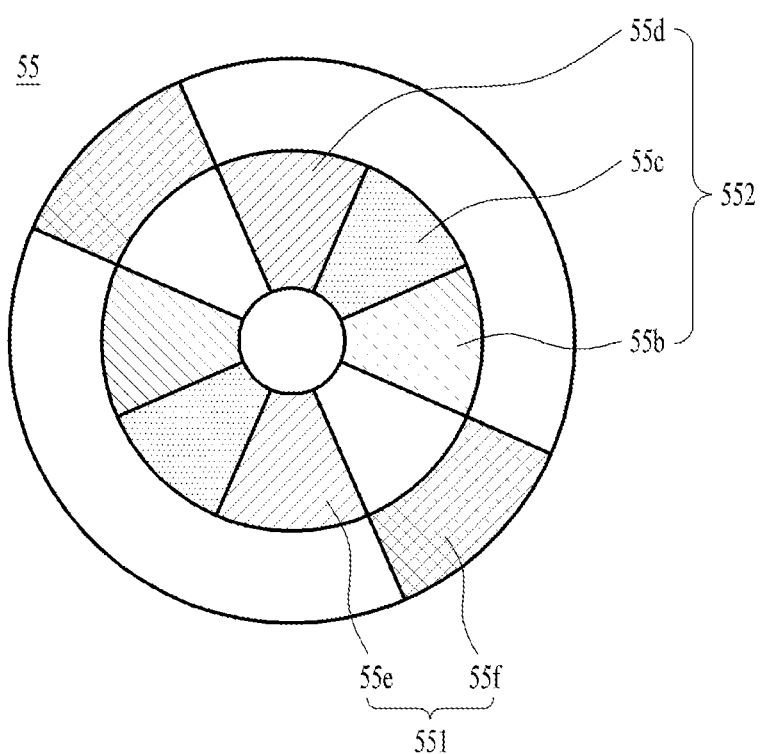

FIG. 4 is a diagram showing a color wheel 55 in which a first color filter 551 and a second color filter 552 are implemented as one. As shown in FIG. 4 (a), the first color filter 551 and the second color filter 552 may be configured in a combined form. As shown in FIG. 4 (b), the first color filter 551 and the second color filter 552 may be implemented in a manner of being divided according to distances from a center.

Referring to FIG. 4 (a), red, green and yellow color films 55b, 55c and 55d of the second color filter transmit phosphorescence into yellow, green and red lights and also plays a role as a reflective part 55e of the first color filter that reflects a laser light of a blue light. The reflective part 55e may be implemented in a manner that a dichroic filter is disposed on the color films 55b, 55c and 55d to overlap. When a laser light passes through a transmissive part 55f, light is not supplied on the second color filter, a transmissive part 55f that transmits a blue light may be disposed.

In FIG. 4 (b), the first color filter 551 and the second color filter 552 may be disposed in a manner of being located in different distances from a rotation center, respectively. A first filter disposed in a first distance from the center includes a reflective part 55e and a transmissive part 55f. A second filter is disposed in a second distance from the center and includes red, yellow and green color films 55b, 55c and 55d. In the drawing, the first color filter 551 is located outside and the second color filter 552 is located inside. Alternatively, the locations of the two color filters may be switched to each other.

The color films 55b, 55c and 55d are disposed at positions corresponding to the reflective part 55e, a light reflecting from the reflective part 55e is converted into a phosphorescence through the phosphor plate. The phosphorescence passes through the color films 55b, 55c and 55d of the second color filter 552 again and the light having passed through the transmissive part 55f is not supplied to the second color filter 552, whereby a corresponding area may be emptied.

Although color filters may be disposed on the color wheel 55 one by one, as shown in FIG. 4, each color filter may be provided to every two areas in a point symmetry structure on a disc and a reflective part 55e and a transmissive part 55f may be partitioned as two areas.

The light reflecting from the reflective part 55e of the first filter is supplied to the phosphor plate 56. According to the embodiment of the related art shown in FIG. 6, a dichroic filter 53a, which transmits a light of a specific wavelength band only in a manner that a wavelength of a light directly supplied to and reflecting from the phosphor plate 56 changes, is disposed between the phosphor plate 56 and the light source 51, whereby the laser light supplied from the light source 51 may pass through and the light reflecting from the phosphor plate 56 may be reflected. Yet, since the reflective light reflecting from the first color filter 551 of the present embodiment has the same wavelength of the laser light, it is unable to use a dichroic filter. Therefore, as shown in FIG. 3, the first color filter 551 is disposed not in a direction confronting the light source 51 but in an inclined direction, whereby a heading direction of the laser light supplied from the light source 51 is different from that of the reflective light.

Figure 5:
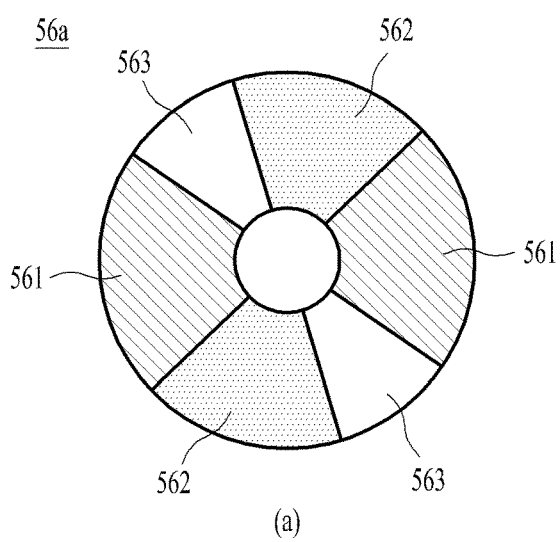
FIG. 5 is a diagram showing an embodiment of a phosphor plate of a projector of the present disclosure.
Figure 5:
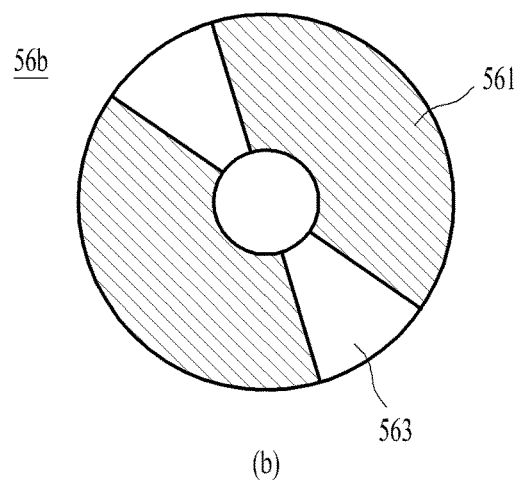
Figure 5:
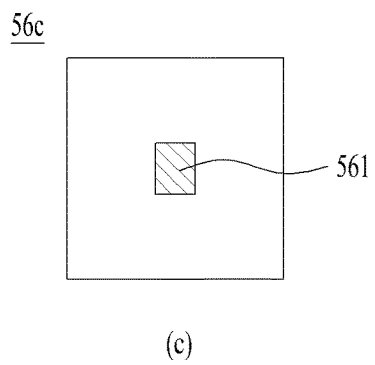

To reduce a size of the optical system 50, a light is bent using a mirror 53b and then supplied to the phosphor plate 56, and the phosphor plate 56 reflects the light by changing a wavelength. FIG. 5 is a diagram showing an embodiment of the phosphor plate 56. As shown in FIG. 5 (a) and FIG. 5 (b), phosphor wheels 56a and 56b are available. As shown in FIG. 5 (c), a phosphor plate 56c of a fixed type is available.

Regarding the phosphor wheels 56a and 56b, two kinds of phosphorescent materials may be coated by being partitioned like (a), or a phosphorescence in one color us formed using a single phosphorescent material only and the other color may be implemented by making a phosphorescence pass through the second color filter 552.

According to a related art, as a laser light projected from the light source is directly supplied to the phosphor wheel 6, some of the light from the light source 51 should be transmitted without being converted into phosphorescence. Hence, since a transmissive part 563 is mandatory as well as the phosphorescent material 561/562 is coated, it cannot be implemented as a fixed structure but should be formed on a moving structure such as a disc.

The phosphor wheel 56a/56b has a large volume and needs a motor for a rotational structure and the periodicity of the phosphor wheel 56a/56b should match that of the color wheel 55. Yet, according to the present disclosure, some of the laser light is filtered off through the transmissive part 55f in the first color filter 551 and the reflective light is supplied only. Hence, since it is not necessary to use a dynamic member, the fixed-type phosphor plate 56c is available. In case of the fixed-type phosphor plate 56c, since a reflective light is incident on one kind of a phosphorescent material 561 only, it may be converted into a phosphorescence in a single color only. For example, a reflective light may be supplied to a plate on which a phosphorescent material 561 for converting a light into a yellow phosphorescence is coated.

Since a wavelength of the light reflecting from the phosphor plate 56 is changed, a reflective light supplied to the phosphor plate 56 may be transmitted using a first dichroic filter 53a and a phosphorescence reflecting from the phosphor plate 56 may be supplied to the second color filter 552. A position that the phosphorescence is supplied to the second color filter 552 and a position supplied with the light supplied from the light source 51 may be symmetrically disposed from a rotation center of the color wheel 55.

The phosphorescence having passed through the second color filter 552 is converted into yellow, green and red and supplied to the display element 58. In order to supply the transmissive light transmitted by the first color filter 551 to the display element 58 as well, as shown in FIG. 3, a second dichroic filter 53b is available.

Since a light should be supplied in a manner of going straight, the condensing lens 52 such as a collimator lens or a relay lens may be disposed between the respective members. As shown in FIG. 3, a first condensing lens 52a, through which a laser light supplied from the light source 51 passes, and a second condensing lens 52b, through which a light having passed through the transmissive part 55f of the first color filter 551 passes before being supplied to the display element 58, may be included.

In addition, a third condensing lens 52c, through which a reflective light reflecting from the first color filter 551 is transmitted, a fourth condensing lens 52d, through which phosphorescence reflecting from the phosphor plate 56 passes, a fifth condensing lens 52e, through which a light through the first dichroic filter 53a passes, and a sixth condensing lens 52f, which condenses and supplies the light having passed through the second color filter 552 to the display element 58, may be included.

As described above, the number of lenses used for the optical system 50 can be decreased by shortening an optical path, thereby reducing a volume thereof.

In addition, the phosphor plate 56 can use a fixed type structure instead of a wheel shape, thereby simplifying a volume and structure of the optical system 50.

In addition, a color filter is implemented with a single wheel, thereby resolving the difficulty of synchronization occurring in using a plurality of wheels.

The above embodiments are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

What is claimed is:

1. A projector, comprising:
a light source projecting a laser light;
a color disc rotating around a center thereof, wherein the color disc includes
a first color filter including a reflective part reflecting the laser light projected from the light source and a transmissive part transmitting the laser light;
a phosphor plate converting the laser light reflecting from the reflective part of the first color filter into a phosphorescence, wherein the color disc further includes
a second color filter including color films of different colors through which the phosphorescence passes; and
a display element projecting an image by being provided with the laser light transmitted by the transmissive part of the first color filter and the phosphorescence having passed through the color films of the second color filter,
wherein the color films are entirely disposed at a position corresponding to the reflective part of the first color filter.

2. The projector of claim 1, wherein the first color filter includes the reflective part and the transmissive part disposed in a first distance from the center of the color disc and wherein the color films of the second color filter are disposed in a second distance from the center of the color disc.

3. The projector of claim 1, wherein the reflective part of the first color filter is disposed in a manner of overlapping with the color films of the second color filter.

4. The projector of claim 1, wherein the phosphor plate includes a phosphorescent material located in a same distance from a center of a rotating disc and wherein one or two species of the phosphorescent material exist.

5. The projector of claim 1, wherein the phosphor plate includes a fixed position mirror coated with a phosphorescent material reflecting the laser light by converting the laser light into the phosphorescence.

6. The projector of claim 1, further comprising a first dichroic filter enabling one of the laser light reflecting from the first color filter or the phosphorescence reflecting from the phosphor plate to pass through and reflecting the other.

7. The projector of claim 1, further comprising a second dichroic filter transmitting the laser light transmitted in the first color filter and transmitting the phosphorescence having passed through the second color filter.

8. The projector of claim 1, wherein the light source includes a laser diode emitting a blue light.

9. The projector of claim 8, wherein the phosphor plate includes a phosphorescent material converting the light source into yellow or green.

10. The projector of claim 1, further comprising a first mirror reflecting and providing the laser light having passed through the first color filter to the display element.

11. The projector of claim 1, further comprising a second mirror reflecting and providing the laser light reflecting from the first color filter to the phosphor plate.

12. The projector of claim 1, wherein the laser light is obliquely incident on the color disc and a direction of the laser light reflected at the reflective part of the first color filter is different from a direction of the laser light incident to the reflective part.

13. A projector comprising:
a light source projecting a laser light;
a color disc rotating around a center, wherein the color disc includes
a first color filter including a reflective part reflecting the laser light projected from the light source and a transmissive part transmitting the laser light;
a phosphor plate converting the laser light reflecting from the reflective part of the first color filter into a phosphorescence, wherein the color disc further includes
a second color filter including color films of different colors through which the phosphorescence passes; and
a display element projecting an image by being provided with the laser light transmitted by the transmissive part of the first color filter and the phosphorescence having passed through the color films of the second color filter,
wherein the laser light projected directly from the light source is obliquely incident on the color disc and a direction of the laser light reflected at the reflective part of the first color filter is different from a direction of the laser light incident to the reflective part.

\* \* \* \* \*